Figure 1:
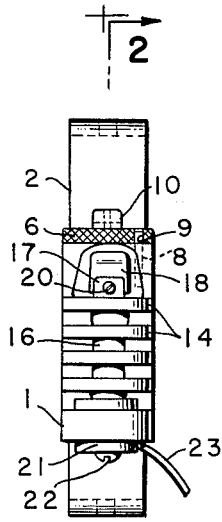

March 15, 1966

J. M. GREEN ETAL 3,240,654

YARN WELDING DEVICE

Filed June 18, 1962

2 Sheets-Sheet 1

INVENTORS
J. M. GREEN
J. R. WILLIAMS

BY Stanley M. Tarter

ATTORNEY

March 15, 1966 J. M. GREEN ETAL 3,240,654
YARN WELDING DEVICE
Filed June 18, 1962 2 Sheets-Sheet 2

INVENTORS
J. M. GREEN
J. R. WILLIAMS
BY Stanley M. Tarter
ATTORNEY

United States Patent Office 3,240,654
Patented Mar. 15, 1966

3,240,654
YARN WELDING DEVICE
John M. Green, Pensacola, Fla., and James R. Williams, Robertsdale, Ala., assignors to Monsanto Company, a corporation of Delaware
Filed June 18, 1962, Ser. No. 203,333
7 Claims. (Cl. 156—433)

This invention relates to welding devices for permanently joining thermoplastic yarns, and more particularly, relates to a yarn welding device providing means for coating and fusing overlapped segments of yarns for effecting a durable joint.

In sundry textile activities, such as in yarn winding and weaving operations, it is common practice to tie or unite the ends of yarns from many yarn packages to establish continuous yarn operations. Methods employed for uniting yarn ends include knotting, cementing, and welding. Another improved method combines both chemical and thermal applications. The latter method comprises the application of a chemical and the subsequent application of heat to contiguously placed segments of yarns which are intended to be permanently joined. The equipment employed for carrying out this improved method, primarily a dish containing a chemical and a separate heating block, is inefficient and unsatisfactory.

It is the primary object of the present invention to provide a novel yarn welding device of unit construction combining yarn coating and yarn fusing means to produce effective thermo-chemical joining of yarns.

Another object is to provide a yarn welding device including yarn trimming means.

A further object is to provide a compact, inexpensive, and simple yarn welding device.

In general, the welding device embodying the invention for permanently joining separate yarns comprises a casing adapted to be mounted on a bracket, belt, or the like. A reservoir is defined in the casing and is supplied with a liquid agent through an opening therein. The opening is normally sealingly covered by a cap which is adapted to support a wick of liquid absorbing material in such a manner that one end thereof is dipped in the fluid in the reservoir while the opposite end is positioned to permit segments of overlapped yarn ends to be brought into contact therewith so as to coat the yarn ends with the fluid from the reservoir.

A heater assembly is operatively mounted on said casing within a bore defined in a plurality of spaced linearly arranged bars. The bars form a grill serving to dissipate heat normally radiating from the heater assembly. The heater assembly includes a resistor connected to a source of electrical energy, a conductor element associated with the resistor, and a fusing tool operatively connected to the conductor element and providing tapered heating surfaces adapted to receive overlapped yarn segments.

In use, two or more segments or ends of nylon or other synthetic yarns are placed in contiguous overlapped relation. The overlapped portions are then brought into contact with the wick to coat them with the fluid absorbed from the reservoir. The coated areas of the yarns are then immediately forwarded into the space between the tapered heated surfaces of the fusing tool in the heater assembly and are compressed against these surfaces to promote the fusing action between the overlapped yarn segments. The combination of heat and the liquid agent is effective to cause the yarns to fuse and upon withdrawal of the yarns from the fusing tool and subsequent cooling thereof a durable joint is produced.

The invention will be more fully understood by referring to the accompanying drawing and the following detailed description.

Figure 2:
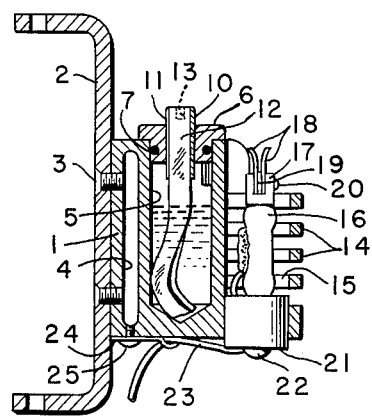
Figure 3:
Figure 4:
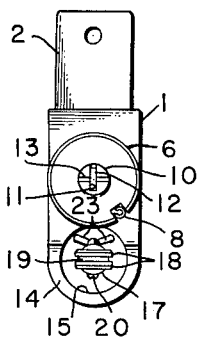
Figure 4:
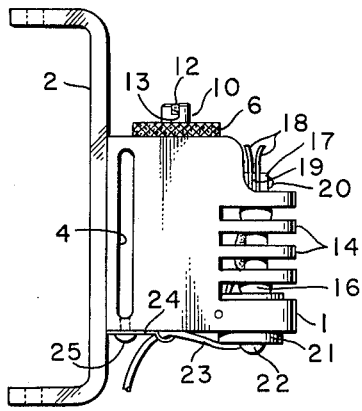
Figure 5:
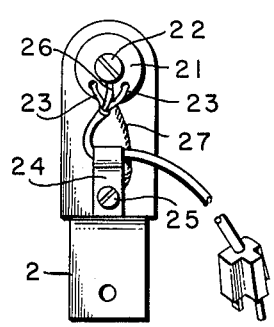
Figure 6:
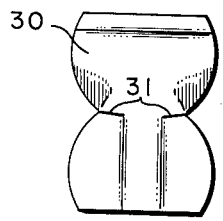
Figure 7:
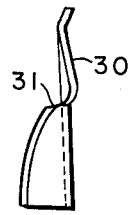
Figure 8:
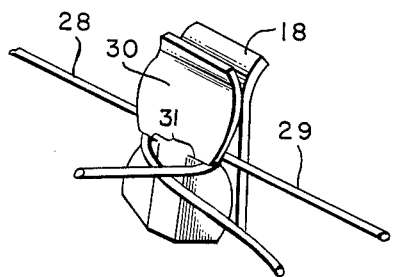
Figure 9:
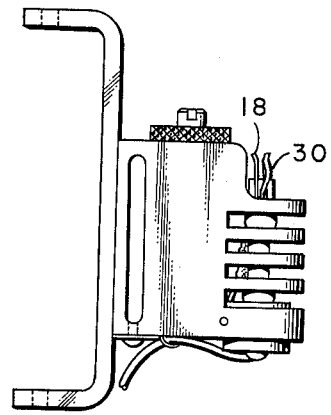

In the drawing:
FIGURE 1 is an elevation view of the novel welding device;
FIGURE 2 is a sectional view taken through 2—2 of FIGURE 1;
FIGURE 3 is a plan view of the novel welding device;
FIGURE 4 is a side view of the welding device shown in FIGURE 1;
FIGURE 5 is a bottom view of the welding device shown in FIGURE 1;
FIGURE 6 is an elevation view of a modified yarn trimming means;
FIGURE 7 is a side view of the modified trimming means shown in FIGURE 6;
FIGURE 8 is a view showing the method of trimming yarn ends with the modified trimming means; and
FIGURE 9 is a side view of the welding device incorporating the modified trimming means.

Like components in each of the figures are designated by like reference numerals for ease of identification and for simplicity reasons.

The yarn welding device embodying the invention comprises as shown in the drawing, FIGURES 1-5, a block body or casing 1 mounted on a bracket 2 by screws 3. Casing 1 is provided with a slot 4 for the insertion of a strap or the like as an alternate means of mounting the welding device.

A cavity or reservoir 5, open at one end thereof, is defined within the casing 1. Reservoir 5 serves as a fluid agent or liquid container. A removable cap 6 is provided to cover the open end of reservoir 5. Cap 6 has a larger circumferential portion which is adapted to seat on the edge of the open end of the reservoir 5 and a smaller circumferential portion formed at one side of the larger portion adapted to fit into the opening of cavity 1. A seal 7 is mounted in a groove formed in the smaller diameter portion to provide sealing engagement of the cap with the opening in the reservoir. Cap 6 is, preferably, knurled on its outer periphery for ease of handling. Reservoir 5 is vented and filled by means of a slit tube 8 mounted in a bore extending inwardly of casing 1 and being open to the reservoir 5 through a slit thereon. The slit in tube 8 is aligned with the slit in the bore. A recess 9 on the periphery of the knurled portion of cap 6 permits tube 8 to extend into the recess 9 when the cap 7 is placed over the opening in the reservoir 5. The tube 8 also locks cap 6 from rotating.

A coaxial stem 10 is press-fit into a bore extending through cap 6. Stem 10 extends beyond the faces of the smaller and larger circumferential portions and has a longitudinal slot 11 open at one side thereof and extending throughout the length thereof. A wick 12 of a liquid absorbing material is positioned in slot 11. At its outer end projecting beyond the face of the larger circumferential portion of the cap 6, stem 10 has another slot 13 extending inwardly from the end thereof and perpendicularly to slot 11. Slot 13 extends diametrically through the end of stem 10.

Casing 1 also includes an integrally formed grill including a plurality of spaced arcuate bars 14 in linear alignment. A common bore 15 extends through the arcuate bars 14. Preferably, bore 15 and reservoir 5 are situated in close proximity to each other so that one end of bore 15 is near the open end of reservoir 5.

A heater assembly is mounted within bore 15 of the grill. The heater assembly comprises a hollow resistor 16 having a pair of terminals. A heat conducting member 17 extends through resistor 16. Member 17 has a threaded bore at one end and an enlarged mounting portion at its opposite end thereof. The enlarged portion includes a slot in which a yarn fusing tool is suitably mounted. The fusing tool comprises a pair of plates 18 mounted within the slot in the enlarged end of member 17 and a spacer 19 interposed between the plates 18. Spacers 19 of different size may be used to vary the distance between the plates 18 to accommodate different denier yarns. Plates 18 and spacer 19 are held securely in the enlarged portion of member 17 by a set screw 20. The outer ends of plates 18 are bent each in an opposite direction so as to form a tapered yarn receiving jaw.

The heater assembly is mounted axially in spaced relation within bore 15 and bars 14 by means of an insulating member 21 press-fit within the bore 15 in one of the arcuate bars 14 at one end of the grill. Heat conducting member 17 extends into the insulating member 21 at its end opposite the enlarged portion and is secured to the insulating member 21 by means of a screw 22 threaded into the threaded bore at the end thereof.

Resistor 16 is connected to a source of electrical power by a pair of lead wires 23 which connect to terminals of a plug. The lead wires 23 extend from the resistor 16 to the plug through respective holes formed in the insulating member 21 and are secured to the casing 1 by a clamp 24 and screw 25. A ground wire 26 is fastened under the screw 22 at one end and is connected to the plug at its opposite end while a shorter ground wire 27 is used to ground casing 1 and is fastened at one end under screw 22 and secured at its opposite end under clamp 24. If desired, one continuous ground wire may be used.

Preparatory to fusing the yarns, casing 1 is mounted on a frame in such as a yarn weaving or yarn winding area, preferably, with the open end of reservoir 5 and the plates 18 in an upper position as shown in the drawing. Reservoir 5 is filled with a liquid agent.

The liquid agent used in welding nylon yarn ends may be dihydroxybenzene or trihydroxybenzene. Dihydroxybenzene bonding agents which can be employed include resorcinol, hydroquinone, and pyrocatechol. The trihydroxybenzenes include pyrogallol, for example.

Cap 6 with a wick 12 located in the slot 11 is then sealingly fitted into the opening in the reservoir 5 so that one end of wick 12 is immersed in the liquid agent and the opposite end intersects slot 13. The liquid agent will be absorbed by the wick 12. The plug to which lead wires 23 and ground wire 26 are attached is connected to a source of electricity and the current will flow to the resistor 16. The resistor 16 heats the conducting member 17 and plates 18 to an equilibrium temperature determined by the resistance value of the resistor 16.

In operation, two ends of such as nylon yarns 28 and 29 or segments of a plurality of continuous yarns are placed in contiguous overlapped relation. The overlapped ends of the yarns are then inserted into slot 13 and are pressed against wick 12 to coat the yarns 28 and 29 with the liquid agent in the wick 12. After the yarns are sufficiently coated, the overlapped ends are immediately forwarded into the tapered receiving jaw of plates 18 of the fusing tool. The yarns are preferably inserted into the narrow end of the jaw to compress them between the surfaces of the plates 18 so as to augment the fusing action. The yarns 28 and 29 are then withdrawn from the plates 18 and the fused joint is permitted to cool.

A modified blade or plate 30 adapted to permit the ends of the joined yarns 28 and 29 to be trimmed is shown in FIGURES 6–9. Modified blade 30 has a bent upper edge and V-shaped side edges. At each side of the blade 30 there is a cutting edge 31 to permit severing of the excess yarn ends. The cutting edges 31 may be formed by cutting into each side of the blade 30 with shears whereby one side of the sheared portion of the blade 30 becomes the cutting edge 31 while the opposite side is bent away forming a slot adapted to receive a yarn end. Preferably, a groove is provided in the bottom portion of the blade 30 to accommodate a spacer 19.

FIGURE 8 shows the method of severing the excess ends of yarns 28 and 29. The end of one yarn 28 is placed into the yarn receiving slot at the side of the blade adjacent the cutting edge 31 and the end of the other yarn 29 is similarly placed into the slot at the opposite side. By forcing the yarn ends 28 and 29 against respective cutting edges 31 the yarn ends are severed or trimmed.

FIGURE 9 shows blade 30 associated with a plate 18 in operating arrangement within the welding device.

The novel welding device is compact and inexpensive in construction and provides an efficient means for expediting the thermochemical joining of overlapped segments of yarns.

It is to be understood that according to the spirit of the invention numerous modifications and variations of the embodiments set forth above may be contemplated. As for example, although reservoir 5 is shown integral within casing 1, a separate container adapted to carry a wick could be associated with casing 1. It is intended that the invention be limited only by the scope of the following claims.

The apparatus claimed is:

1. A yarn welding unit for joining yarns comprising, in combination,
   casing means having a liquid reservoir and a liquid applicator means associated therewith,
   heater means connected to a source of electrical energy and mounted on said casing means,
   heat dissipating means on said casing means arranged adjacent to said heater means to dissipate heat radiating therefrom thereby permitting close juxtaposed positioning of said heater means and said liquid reservoir and applicator means, whereby, yarns may be manually wetted with a liquid and thermally welded in rapid sequence to permanently join yarns.

2. A yarn welding unit for joining yarns comprising, in combination,
   casing means having a liquid reservoir and a stationary liquid applicator means associated therewith,
   stationary heater means connected to a source of electrical energy mounted on said casing means,
   heat dissipating means on said casing means arranged adjacent to said stationary heater means to absorb and dissipate heat radiating therefrom thereby permitting close juxtaposed positioning of said stationary heater means and said liquid reservoir and stationary applicator means, whereby, yarns may be manually wetted with a liquid by contact with said stationary applicator means and thermally welded in rapid sequence to permanently join yarns.

3. A yarn welding unit for joining yarns as in claim 2 wherein,
   said stationary liquid applicator means comprises an absorbent wick,
   said stationary heater means includes a pair of spaced heater plates having an open end for the insertion therein of yarns to effect a weld, said open end of said stationary heater plates being closely juxtaposed to said absorbent wick,
   said heat dissipating means comprises a grill positioned adjacent said stationary heater means, and
   at least one of said heater plates having oppositely disposed cutting edges for trimming the yarns.

4. A yarn welding unit for joining yarns comprising, in combination,
   a casing having walls defining a liquid supplied reservoir and having an integrally formed grill adjacent said reservoir,
   absorbent means operatively supported on said casing and having one end immersed in the liquid in said reservoir and the opposite end exposed,
   stationary heater means connected to an electrical source of energy and insulatably mounted on said casing in operative association with said grill to dissipate heat radiated therefrom and in close operative juxtaposition to the opposite end of said absorbent means to permit rapid sequential contact of the yarns with said absorbent means and said heater means for effecting a permanent weld of the yarns.

5. A yarn welding unit as in claim 4 wherein, said heater means includes a pair of spaced plates having an open tapered jaw at one end thereof for the insertion therein of liquid wetted yarns to effect a weld and wherein, said absorbent means comprises a wick positioned in close adjacency to said open tapered jaw to permit rapid sequential operation thereof.

6. A yarn welding unit as in claim 5 wherein, at least one of said spaced plates has oppositely disposed cutting edges adjacent said open tapered jaw for trimming the joined yarns.

7. A yarn welding unit for joining yarns comprising,
(a) a casing defining a bore therein open at one end thereof,
(b) a cap sealingly mounted on said casing at the open end of said bore,
(c) a wick supported on and extending through said cap so that one end thereof contacts the liquid in said bore and the opposite end is exposed,
(d) said casing defining a centrally perforated grill contiguous to said bore,
(e) a heater mounted in said centrally perforated grill on said casing,
(f) said heater including spaced heater plates providing a tapered jaw for receiving yarn, said heater plates arranged closely adjacent said exposed end of said wick, and
(g) oppositely disposed cutting edges provided on at least one of said heater plates.

References Cited by the Examiner
UNITED STATES PATENTS

| | | | |
|---|---|---|---|
| 2,812,795 | 11/1957 | Chang et al. | 156—433 |
| 3,012,398 | 12/1961 | Merkle | 156—433 |

EARL M. BERGERT, *Primary Examiner.*